US012084366B2

(12) United States Patent
Knoll et al.

(10) Patent No.: US 12,084,366 B2
(45) Date of Patent: Sep. 10, 2024

(54) TITANIA-BASED TREATMENT SOLUTION AND METHOD OF PROMOTING PRECIPITATION AND REMOVAL OF HEAVY METALS FROM AN AQUEOUS SOURCE

(71) Applicant: Marmon Industrial Water LLC, Warren, NJ (US)

(72) Inventors: James Knoll, Glen Gardner, NJ (US); Katie Henderson, Smyrna, DE (US); Joshua L. Mertz, Townsend, DE (US)

(73) Assignee: Marmon Industrial Water LLC, Warren, NJ (US)

( * ) Notice: Subject to any disclaimer, the term of this patent is extended or adjusted under 35 U.S.C. 154(b) by 0 days.

(21) Appl. No.: 17/713,521

(22) Filed: Apr. 5, 2022

(65) Prior Publication Data

US 2022/0227653 A1   Jul. 21, 2022

Related U.S. Application Data

(62) Division of application No. 16/387,716, filed on Apr. 18, 2019, now Pat. No. 11,339,075.

(60) Provisional application No. 62/659,749, filed on Apr. 19, 2018.

(51) Int. Cl.
| | | |
|---|---|---|
| *C02F 1/52* | (2023.01) | |
| *C02F 11/122* | (2019.01) | |
| *C02F 101/10* | (2006.01) | |
| *C02F 101/12* | (2006.01) | |
| *C02F 101/20* | (2006.01) | |
| *C02F 101/22* | (2006.01) | |

(52) U.S. Cl.
CPC .......... *C02F 11/122* (2013.01); *C02F 1/5245* (2013.01); *C02F 2101/103* (2013.01); *C02F 2101/12* (2013.01); *C02F 2101/20* (2013.01); *C02F 2101/22* (2013.01); *C02F 2209/06* (2013.01)

(58) Field of Classification Search
CPC ..................................... C02F 1/5245
See application file for complete search history.

(56) References Cited

U.S. PATENT DOCUMENTS

| | | | |
|---|---|---|---|
| 4,275,041 A | 6/1981 | Waldman et al. | |
| 4,282,092 A | 9/1981 | Fujita | |
| 5,162,283 A | 11/1992 | Moini | |
| 5,505,857 A | 4/1996 | Misra | |

(Continued)

FOREIGN PATENT DOCUMENTS

| | | |
|---|---|---|
| CN | 103071448 | 5/2013 |
| CN | 103304000 | 9/2013 |

OTHER PUBLICATIONS

Marino, Tiziana, et al., "Arsenic Removal by Liquid Membranes", Institute on Membrane Technology, Mar. 27, 2015, pp. 150-167.

*Primary Examiner* — Peter Keyworth
(74) *Attorney, Agent, or Firm* — DeLio Peterson & Curcio LLC; Robert Curcio

(57) ABSTRACT

A treatment solution and method for removing heavy metal contaminants and oxyanion contaminants from an aqueous solution by promoting the affinity of precipitating the contaminants. The method adjusts the pH and the ORP of the contaminated aqueous solution by applying $FeCl_2$ and/or NaOH reducing agents, and using and applying a titania-based treatment solution of $TiO(SO_4)$, $H_2SO_4$, and $FeSO_4$.

9 Claims, 7 Drawing Sheets

(56) References Cited

U.S. PATENT DOCUMENTS

| | | |
|---|---|---|
| 5,821,186 A | 10/1998 | Collins |
| 6,919,029 B2 | 7/2005 | Meng et al. |
| 7,473,369 B2 | 1/2009 | Meng et al. |
| 7,497,952 B2 | 3/2009 | Meng et al. |
| 7,833,483 B2 | 11/2010 | Ku et al. |
| 8,216,543 B2 | 7/2012 | Chen et al. |
| 8,268,268 B2 | 9/2012 | Lu et al. |
| 8,668,888 B2 | 3/2014 | Auer et al. |
| 2002/0113023 A1 | 8/2002 | Krulik |
| 2009/0311153 A1 | 12/2009 | Roche |
| 2010/0065502 A1 | 3/2010 | Konishi |
| 2013/0032532 A1 | 2/2013 | Nobukazu |
| 2014/0374358 A1 | 12/2014 | Lewis et al. |

| Ion | Adsorption, mg/g | |
|---|---|---|
| | HMRP50 (MetSorb®) | Titania-based treatment solution |
| Antimony(III) | 103 | 168 |
| Phosphorus(V) | 8.2 | 17.9 |
| Lead(II) | 162 | 415 |
| Arsenic(V) | 6.2 | 6.0 |

FIG. 2

| Actual Time | Time (min) | Action | g additive | ORP, mV | pH | [Se] | % removal |
|---|---|---|---|---|---|---|---|
| | 0 | - | | 97 | 7.77 | 14.5 | |
| | 0 | Add FeCl2 | 1.357 | | | | |
| | 1 | | | -54 | 5.98 | | |
| | 2 | | | -52 | 5.88 | | |
| | 5.5 | Sample 1 | | -52 | 5.86 | 15.2 | |
| | 9 | Sample 2 | | | | 15 | |
| | 11 | Add BL | 1.383 | | | | |
| | 12 | | | 386 | 2.34 | | |
| | 14 | Add Fe Cl2 | 0.875 | | | | |
| | 15.5 | | | 362 | 2.26 | | |
| | 18 | Add NaOH | 100uL | | | | |
| | 19 | | | 350 | 2.7 | | |
| | 19.75 | Add NaOH | 1 | | | | |
| | 21 | | | -174 | 5.03 | | |
| | 23 | pictures (phone) | | | | | |
| | 24 | | | -310 | 5.66 | | |
| | 27 | | | -332 | 5.96 | | |
| | 29 | | | -338 | 6.12 | | |
| 11:58:00 AM | 32.5 | Sample 3 ? | | -351 | 6.36 | | |
| | 136 | | | -327 | 7.21 | | |
| | 146 | Sample 3 ? | | | | 1.5 | 0.901316 |
| | 148 | Sample 4 | | | | 1.5 | 0.901316 |
| 2:17:00 PM | 171.5 | Sample 4a | | | | 0.98 | 0.935526 |
| 2:29:00 PM | 183.5 | Sample 4b | | | | 0.56 | 0.963158 |

FIG. 3

| Time | Sample | [Se] | % Removal |
|---|---|---|---|
| 0 | 0 | 14.5 | |
| 5.5 | 1 | 15.2 | |
| 9 | 2 | 15 | |
| 32.5 | 3 | 1.5 | 90% |
| 171.5 | 4a | 0.98 | 93% |
| 183.5 | 4b | 0.56 | 96% |

TITANIA-BASED TREATMENT SOLUTION AND METHOD OF PROMOTING PRECIPITATION AND REMOVAL OF HEAVY METALS FROM AN AQUEOUS SOURCE

BACKGROUND

1. Field of the Invention

The present invention is directed to removing contaminants from solution, and in particular, from removing heavy metals, oxyanions, and precipitates from aqueous solutions. More specifically, the present invention is directed to a treatment solution, and a method of applying the treatment solution, for combining with a contaminated aqueous source to promote the affinity of precipitating contaminants, the treatment solution having $TiO(SO_4)$ in an approximate amount of 10% to 50% wt, $H_2SO_4$ in an approximate amount of 5% to 25% wt, and $FeSO_4$ in an approximate amount of 0% to 10% wt.

2. Description of the Related Art

The removal of contaminants, and in particular heavy metals, from contaminated water is well known. Conventional approaches include use of sorbents (ion exchange media or adsorbents) or sorbent products that are precipitated out as a solid. Prior to use thereof, these solid sorbents (sorbent products) are purified, used to remove contaminants from an aqueous source (e.g., to remove heavy metals from contaminated water). For instance, titania-based adsorbents have a high affinity towards oxyanions, heavy metals, and fluoride, and as such, may be used to remove these contaminants from industrial waste water, drinking water, radioactive waste water, and the like.

Titania-based adsorbents may include titanium oxide-based adsorbents such as, for instance, hydrous titanium oxide, titanium hydroxide, and hydrated titanium dioxide-based. An exemplary purified titanium oxide-based adsorbent is MetSorb® by Graver Technologies, also referred to as MetSorb® HMRP and MetSorb® HMRG. While solid sorbents or sorbent products are efficient and effective in removing contaminants from aqueous sources, they can be expensive, difficult, and/or time consuming to use.

SUMMARY OF THE INVENTION

Bearing in mind the problems and deficiencies of the prior art, it is therefore an object of the present invention to provide a treatment solution for removing contaminants from an aqueous source.

It is another object of the present invention to provide a method for removing contaminants from an aqueous source.

The above and other objects, which will be apparent to those skilled in the art, are achieved in the present invention which is directed to a treatment solution for removing contaminants from contaminated aqueous source, the treatment solution comprising: a liquid solution of mixed metal oxides and a sulfuric acid matrix.

The liquid solution of mixed metal oxides includes a titanyl sulfate solution containing iron oxide. The liquid solution comprises $TiO(SO_4)$, $H_2SO_4$, and an iron salt, where the $TiO(SO_4)$ in the liquid solution is in the range of 10% to 50% wt, the $H_2SO_4$ in the liquid solution is in the range of 5% to 25% wt, and the iron salt comprises $FeSO_4$, $FeCl_2$, and/or $Fe(NO_3)_2$, and the iron salt in the liquid solution is in the range of 0% to 10% wt.

Water is present in the liquid solution in an amount of approximately 20%-85% wt.

In a second aspect, the present invention is directed to a treatment solution for removing contaminants from contaminated aqueous source, the treatment solution comprising: a sulfuric acid solution; titanium oxides in the sulfuric acid solution; and iron oxides in the sulfuric acid solution; wherein, together the titanium oxides and the iron oxides in the sulfuric acid solution render the treatment solution to react in-situ with the contaminated aqueous source to precipitate or sorb the contaminants out of the contaminated aqueous source.

In a third aspect, the present invention is directed to a method of removing contaminants from contaminated aqueous sources comprising: providing an aqueous source having contaminants; providing a treatment solution comprising titanium ions or oxides and iron ions or oxides within a sulfuric acid solution; adding an effective amount of the treatment solution to the aqueous source to react in-situ and render precipitants of the contaminants; separating the precipitants from the aqueous source to render a slurry of the precipitants and a decontaminated aqueous source; and dewatering the slurry of the precipitants for disposal of the precipitants.

In a fourth aspect, the present invention is directed to a method for removing contaminants from contaminated aqueous sources comprising: adding a reducing agent such as sodium sulfide, ferrous nitrate, ferrous chloride, or ferrous sulfate to a contaminated aqueous source at a rate in order to control pH between 5-8 and ORP between −100 to 0 mV; adding sodium hydroxide to control the pH to between 6.5 and 11 and the ORP between −600 mV and 0 mV to precipitate out solid contaminants from the contaminated aqueous source; and filtering the solid contaminants from the contaminated aqueous source.

In a fifth aspect, the present invention is directed to a method for removing contaminants from contaminated aqueous source comprising: identifying at least one contaminant within the contaminated aqueous source; measuring a molar concentration of the at least one contaminant; introducing an effective amount of a treatment solution comprising a sulfuric acid solution containing titanium ions or oxides and iron ions or oxides to the contaminated aqueous source; mixing the treatment solution and the contaminated aqueous source, allowing for predetermined contact time; and filtering the at least one contaminant from the treatment solution and the contaminated aqueous source to obtain treated liquid and contaminated sludge or slurry.

In a sixth aspect, the present invention is directed to a method for removing contaminants from contaminated aqueous source comprising: adjusting pH and/or ORP levels of the contaminated aqueous source by adding an amount of $FeCl_2$ or NaOH, or both to the contaminated aqueous source; mixing the contaminated aqueous source and the $FeCl_2$ or NaOH, or both, varying contact time and/or temperature, to form a treated liquid; monitoring the pH and/or the ORP levels of the treated liquid; filter the treated liquid to separate liquid having a reduced concentration of the contaminants from a sludge or slurry of contaminated fluid.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is a table of resultant adsorption comparing the titania-based treatment solution of the present invention against MetSorb® HMRP50 for the removal of certain contaminants;

FIG. 3 represents test results of 450 ml of contaminated water treated with one embodiment of the treatment solution of the present invention, including adjusting the pH and ORP of the aqueous source with $FeCl_2$ and/or NaOH;

DESCRIPTION OF THE PREFERRED EMBODIMENT(S)

Figure 1:
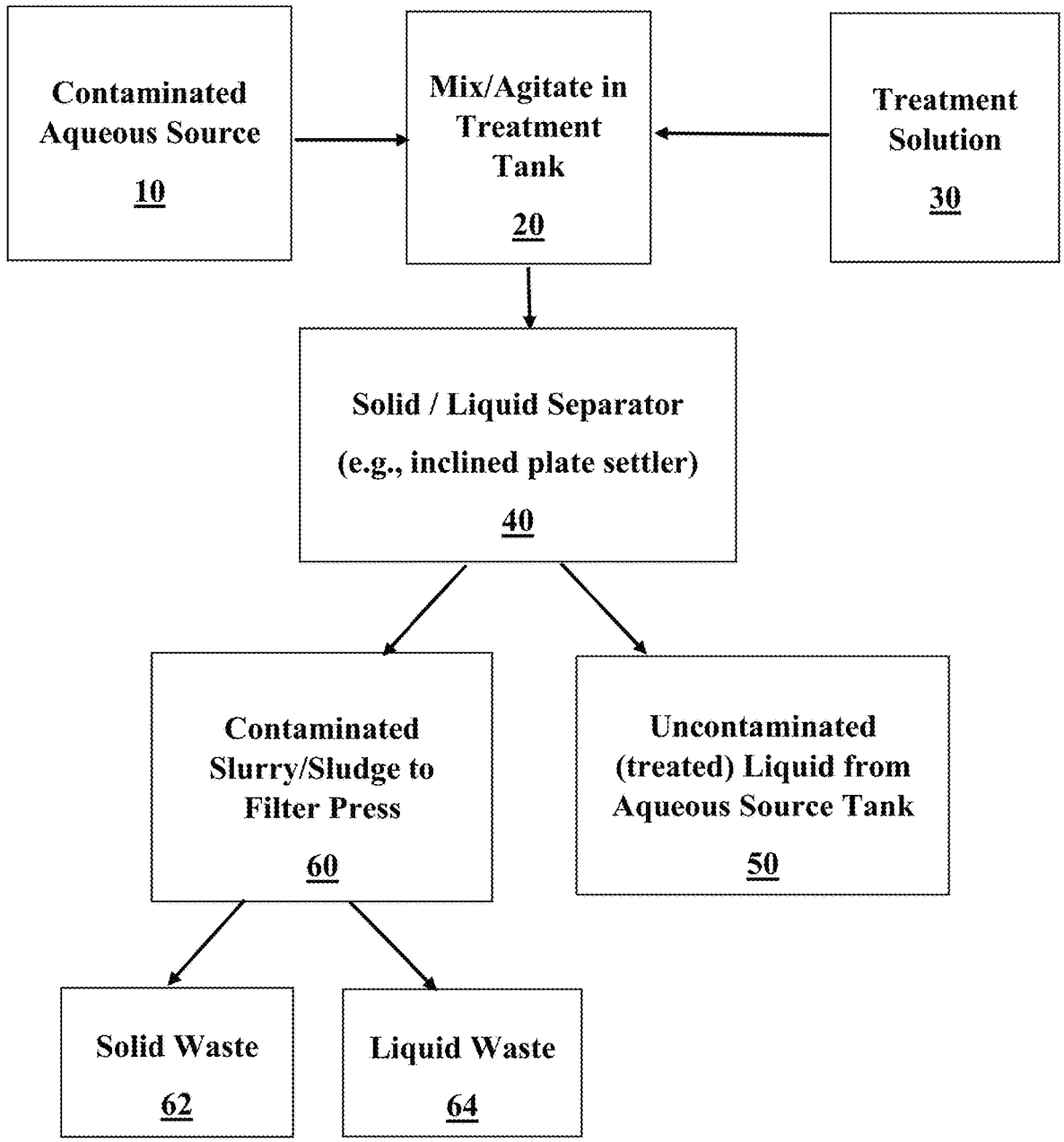
FIG. 1 is a block diagram illustrating an exemplary method of an embodiment of the present invention.

In describing the preferred embodiment of the present invention, reference will be made herein to FIGS. 1-9 of the drawings in which like numerals refer to like features of the invention.

In accordance with the various embodiments, the present invention is directed to treatment solution products and methods of efficiently and effectively removing contaminants from contaminated aqueous sources using certain solution products. The aqueous source(s) may be any type of contaminated aqueous source including, but not limited to, aqueous streams, lakes, waterways, waste water, drinking water, remedial type activity with ground water (e.g., coal ash ponds), flue-gas desulfurization water to name a few. The treatment solutions and methods of the invention are suitable for removing contaminants including, but not limited to, heavy metal contaminants, oxyanion contaminants, cationic contaminants, and combinations thereof.

While not meant to be limiting, heavy metal contaminants removed by the treatment solutions and methods of the invention may include, but are not limited to, elements having an atomic number of 22 or higher, excluding non-metals. The list of heavy metals typically includes lead (Pb), mercury (Hg), arsenic (As), selenium (Se), chromium (Cr), barium (Ba), antimony (Sb), vanadium (V), among others, as well as various combinations thereof. Some of the heavy metals, when dissolved in water form anionic compounds known as "oxyanions". Contaminants may include arsenic (arsenate, arsenite), chromium (chromate (VI)), selenium (selenate, selenite), vanadium (vanadate), antimony (antimonate), and the like.

When elements are dissolved in water or complexed, they can also form positively charged ions (cations). Cationic contaminants removed by the solutions and methods of the invention may include, for example, Pb, Hg, Cd, Cs, Ba, and the like. Other elements form neither cations nor anions. Halides form anions that are not represented by any category listed above. Anionic contaminants removed by the solutions and methods of the invention may include, iodide, fluoride, chloride, bromide, and the like. It should be appreciated that the various treatment solutions and methods of the invention are also suitable for removing any combination of the heavy metals, oxyanion, cationic, and/or anionic materials disclosed herein.

Referring to the salient aspects of the preferred embodiments, the various treatment solutions combine dissolved components with precipitated components to form the suspension, as compared to prior art techniques which consists of solids alone (e.g., powder, particulate, etc.), adsorbents, or adsorbent products. The treatment solutions of the invention comprise a liquid solution of mixed metal oxides, preferably titanium oxides and iron oxides in solution, in combination with a sulfuric acid matrix. In one or more embodiments, the present treatment solutions preferably include a titanyl sulfate solution containing iron oxide as iron(II) sulfate. As compared to the prior art purified solid adsorbents, the solutions of the aforementioned embodiments preferably comprise unpurified titanyl sulfate solutions containing iron (II) sulfate for directly treating contaminated aqueous source (s).

In one or more embodiments, the treatment solutions of the invention may include $TiO(SO_4)$, $H_2SO_4$, $FeSO_4$, or other reducing agents containing iron such as $FeCl_2$, $SeNO_3$, other trace metals, and/or trace salts, and $H_2O$. The $TiO(SO_4)$ may be present in the solution in an amount ranging from about 10% to about 50% by weight. The $H_2SO_4$ may be present in the solution in an amount ranging from about 5% to about 25% by weight. The $FeSO_4$ may be present in the solution in an amount ranging from about 0% to about 10% by weight/volume. In one or more embodiments iron may not be necessary, such as in removing fluoride, whereby $TiO_2$ may remove fluoride without Fe. For arsenic, both $TiO_2$ and FeO/OH may be used to remove As. Water ($H_2O$) may be present in the solution from about 20% to about 85% by weight. In accordance with the invention, it is preferred that at least one or both, Fe or Ti, be present in the instant solutions.

In accordance with the methods of the invention, the treatment solutions of the invention are directly mixed with the contaminated aqueous source. This may be accomplished by directly inputting an effective amount of the present treatment solutions into the entire aqueous source that is to be decontaminated by removal of at least heavy metals, or alternatively, mixing a portion of the contaminated aqueous source with the instant treatment solutions. That is, the aqueous source may be treated continuously, or in sequential (i.e., timed) batches for removal of contaminants. While not meant to be limiting, FIG. 1 illustrates an exemplary method of the invention.

Referring to FIG. 1, a treatment tank 20 is implemented whereby an amount of contaminated liquid from a contaminated aqueous source 10 (e.g., contaminated water) is input into the treatment tank 20 in combination with an amount of the present treatment solution 30 being input into the treatment tank 20. The contaminated aqueous source 10 may include contaminating heavy metals, oxyanions, cations, anions, and the like, and combinations thereof. The effective amount of treatment solution 30 input into the treatment tank 20 along with the contaminated aqueous source 10 may be determined based on the molar ratio of titanium or iron to the contaminant(s) concentration present in the aqueous source, or alternatively, based on pH adjustment.

In other embodiments the effective amount of treatment solution is determined based on both molar ratio concentrations and pH adjustment and oxidation reduction potential (ORP), either concurrently or sequentially.

In one or more embodiments of the invention, the treatment solution 30 may be injected into the contaminated aqueous source 10 (i.e., injected into treatment tank 20) based on the molar ratio of titanium content versus the contaminating concentration of the contaminant (e.g., selenium) being removed. Initially the contaminant being removed from the aqueous source 10 must first be identified, and then the contaminating molar ratio concentration of such contaminant in the aqueous source be determined (i.e., quantified). The identified contaminant is then removed in-situ by injecting an effective amount of the treatment solution 30, as determined based on the titanium content therein, into the treatment tank 20 to result in precipitation of the contaminant.

In other embodiments of the invention, the treatment solution 30 may be injected into the contaminated aqueous source 10 to remove such contaminants based on pH adjustment of the combined in-situ solution. The various treatment solutions 30 of the invention have an acidic pH. In one or more embodiments the treatment solutions 30 comprising sulfuric acid solutions containing titanium and iron (such as a titanyl sulfate solution) may have a pH ranging from about 0 pH to about 2.5 pH, preferably about 0.1 pH to about 2 pH. The contaminated aqueous liquid typically has a higher pH, such that, by adjusting and shifting the pH lower, the contaminants in the aqueous source chemically react with the treatment solution 30 in-situ to form precipitants of such contaminants at lower pH values.

In some instances, it has been observed that the precipitation process may be effective with the lowering of the pH; that is, the contaminants may have an affinity to chemically react with the treatment solution under these conditions. Conversely, it has also been observed that at a high pH level, but lower oxidation reduction potential (ORP), contaminants will chemically react with the treatment solution as well. Both conditions are presented herein.

As an illustrative example of lowering the pH level of a contaminated aqueous source in combination with a treatment solution, an arsenic contaminated water source 10 may have a pH ranging from about 8-9 pH. At this pH the arsenic is in the dissolved form (arsenate/arsenite) and remains in solution. As the treatment solution 30 is injected into and mixed with the arsenic contaminated water source 10 (mixed and agitated in the treatment tank 20), the 8-9 pH of the arsenic contaminated water lowers as it is mixed with an acidic treatment solution 30 of the invention. In one or more embodiments, the preferred pH adjustment range for removing contaminants is between 3 pH to 5 pH. As the acidic treatment solution 30 is added to and mixed with the arsenic contaminated water, the higher pH of the contaminated water is effectively lowered to a pH of about 5 pH. At this point the arsenic reacts in-situ to readily adsorb to titanium and iron compounds in the treatment solution and precipitate out. The precipitates can then be removed from the mixed solutions.

In mixing the contaminated aqueous source 10 and the treatment solutions 30 of the invention, these liquid components contact and are mixed together within the treatment tank or chamber 20.

While reference is made herein to mixing (or agitation) occurring within a treatment tank 20, it should be appreciated and understood that the mixing/agitation of the invention may occur within any type of vessel, chamber, or confined space that allows for such mixing/agitation to occur.

The treatment tank 20 may include a mixer (e.g., a variable speed mixer) or an agitator device that enables mixing and/or agitation of the contaminated aqueous source 10 and treatment solution 30 for precipitation of the contaminants from the aqueous source. In accordance with at least one preferred embodiment, the contaminated aqueous source 10 and treatment solution 30 may contact and mix with each other for a time ranging from about 2 minutes to about 10 hours. In one or more preferred embodiments, the mixing or agitation may occur from about 15-30 minutes to provide homogenous mixing of the instant treatment solutions 30 for precipitating out the target or desired contaminants from the aqueous source.

The temperature range within the mixing/agitation chamber (e.g., within treatment tank 20) may vary depending upon the treatment location, as well as depending upon the type(s) of contaminant(s) being precipitated out from the contaminated aqueous source 10. In one or more embodiments, the temperature may range from about 15° C. to about 80° C. Similarly, in one or more preferred embodiments, mixing may be performed at ambient temperatures and pressures. The temperatures within the mixing/agitation chamber (or tank) may be adjusted up or down to either speed up or slow down the precipitation reaction occurring within the reaction or treatment tank/chamber 20. In other embodiments, the temperature can be controlled to selectively precipitate out solid products. For example, bringing the temperature down to 15° C., or lower, results in preferential precipitation of iron sulfate, leaving the titanyl-sulfate in solution. Further, mixing of the contaminated aqueous source 10 with the treatment solutions 30 may be performed continuously while residing within the treatment tank/chamber 20, or it may be performed intermittently at predetermined (e.g., timed) intervals.

Once the mixing and/or agitation of the contaminated aqueous source 10 with the present treatment solution(s) are completed, a slurry is generated. This slurry includes decontaminated (i.e., treated) liquid of the aqueous source, remaining treatment solution, and particulate contaminants (e.g., solids, etc.) that have precipitated out from the contaminated aqueous source. The slurry is then delivered (e.g., pumped) to a solid liquid separator 40 for filtration or separation. For instance, the solid liquid separator 40 may be an inclined plate settler that allows the decontaminated (i.e., treated) liquid effluent to flow off the top of the inclined plate, while the precipitated contaminant solids fall to the bottom of the inclined plate forming a thick solid sludge or slurry. However, it should be appreciated that the solid liquid separator 40 may be any other type of dewatering or filtering device(s) that enables separation of clean, decontaminated liquid from particulate contaminants residing therein.

As the methods and process flows of the invention continue, the decontaminated (i.e., treated) liquid from the aqueous source is output from the solid liquid separator 40 and into a treated liquid tank or reservoir 50. The precipitated contaminant solids sludge or slurry is delivered from the solid liquid separator 40 into a slurry/sludge press 60.

The press 60 may include, but is not limited to, a filter press, belt press, plate frame press, and the like. While in the press 60 the contaminated slurry/sludge is further dewatered and separated into solid waste 62 and liquid waste 64. For instance, the contaminated slurry/sludge may be pressed into a filter cake of contaminants, which may then be properly disposed of Effluents from the treated tank 50 and/or the liquid waste 64 may be monitored (e.g., using regulatory (EPA) standards) to ensure efficient and adequate contaminant removal for downstream use or disposal of such effluents.

As the contaminants are precipitated out of the contaminated aqueous source, the contaminants (e.g., the heavy metals) adsorb onto the surface of, and precipitate out with, the titanium oxide and iron oxide of the treatment solution. As such, the precipitated contaminant solids sludge or slurry contains a substantial concentration of the titanium oxide and iron oxide constituents. This sludge/slurry is then dewatered, caked, and properly disposed of (e.g., in a landfill).

In one or more preferred embodiments, the process flow of the invention may include treating contaminated water with an effective amount of titanyl sulfate based treatment solution(s). For instance, the water may be contaminated with heavy metals, oxyanions, cations, etc. A treatment solution comprising $TiO(SO_4)$ (10-50% wt), $H_2SO_4$ (5-25% wt), $FeSO_4$ (0-10% wt), other trace metals, and $H_2O$ (20%-85% wt) is then injected into the contaminated water to at least precipitate out metal contaminants. The aforementioned treatment solution is colloquially referred to as "Black Liquor." The direct in-situ chemical reaction of the invention is as follows:

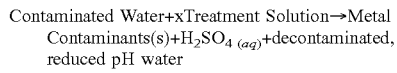

Contaminated Water+xTreatment Solution→Metal Contaminants(s)+$H_2SO_{4\ (aq)}$+decontaminated, reduced pH water In the above identified relationship, contaminated water most likely contains heavy metals and oxyanions. The treatment solution is the Black Liquor identified above having $TiO(SO_4)$, $H_2SO_4$, $FeSO_4$, $H_2O$, and other trace metals and salts. The metal contaminants are sorbed oxyanions on titanium oxides/hydroxides, iron oxides/hydroxides, other trace metals, and other trace salts. For example, arsenate on $TiO_2$ would be shown as sorbed metal on titanium oxides/hydroxides, iron oxides/hydroxides, other trace metals, and other trace salts.

The precipitated metal contaminants include sorbed oxyanions on: titanium oxides/hydroxides, iron oxides/hydroxides, along with other trace metals, and trace salts. For example, the precipitated metal contaminant sorbed oxyanion may be arsenate on $TiO_2$.

Similarly, the precipitated metal contaminants may include sorbed metals on: titanium oxides/hydroxides, iron oxides/hydroxides, along with other trace metals and trace salts. For example, the precipitated metal contaminant sorbed metal may be Hg on $TiO_2$.

An exemplary in-situ reaction in accordance with the invention is shown as follows:

$Hg+2H_2SO_4 \rightarrow HgSO_4+SO_2+2H_2O$

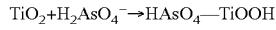

$TiO_2+H_2AsO_4^- \rightarrow HAsO_4—TiOOH$

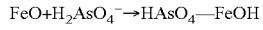

$FeO+H_2AsO_4^- \rightarrow HAsO_4—FeOH$

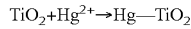

$TiO_2+Hg^{2+} \rightarrow Hg—TiO_2$

Other precipitants of the in-situ reactions of the invention may include, for example, metal-sulfur precipitants, e.g., HgS (cinnabar), metal-salt precipitants (e.g., calomel), and the like. The decontaminated, reduced pH water (pH decreased from the addition of a reducing agent, $H_2SO_4$) rendered by the invention may include trace amounts of salts and unreacted metals.

In accordance with the various embodiments of the invention, it has been found that a treatment solution comprising $TiO(SO_4)$ (10-50%), $H_2SO_4$ (5-25%), $FeSO_4$ (0-10%), other trace metals, and $H_2O$ (20%-85%) effectively removes contaminants directly in-situ within a contaminated aqueous source. The titania-based (i.e., titanyl sulfate based) treatment solutions have been found to be particularly efficient in removing heavy metal contaminants from contaminated water. For instance, via a constant or continuous pH precipitation route as described herein. The titanyl sulfate based treatment solutions, through constant pH reduction precipitation of contaminated solutions having pH ranging from 5 to 9, have been found to exhibit enhanced affinity towards antimony, lead, and phosphorus (2.0-2.5 times higher than the benchmark MetSorb®HMRP/G $TiO_2$), as well as showing an affinity for arsenic.

Referring to the FIG. 2, experiments implementing a treatment solution of the invention for removal of contaminants from one or more contaminated water sources show the benefits of titanyl sulfate based treatment solutions. Tests were performed in batch, under similar conditions and pH, to compare the titania-based treatment solutions with the known solid adsorbent MetSorb®HMRP50. As is shown, the improved results of the titanyl sulfate based treatment solutions include, but are not limited to, a higher adsorption of at least antimony, phosphorous, and lead, while also showing a comparable affinity toward the removal of arsenic.

FIG. 3 represents test results of 450 ml of contaminated water treated with one embodiment of the treatment solution of the present invention, including adjusting the pH and ORP of the aqueous source with $FeCl_2$ and/or NaOH. A first form of the treatment solution (part A) is added to the contaminated aqueous source. In this illustrative embodiment, treatment solution (part A), comprising ferrous chloride ($FeCl_2$), is used as a reducing agent, first added to the contaminated aqueous source water to lower the ORP and pH. Here, the test is configured to remove the contaminant selenate. As noted above, controlling the pH and ORP of the solution lends itself to enhancing the affinity of the treatment solution to acquire the contaminants. Next, a second portion of the treatment solution (part B) is added. This is in the form of the aforementioned Black Liquor ("BL"), which includes $TiO(SO_4)$ (10-50% wt), $H_2SO_4$ (5-25% wt), $FeSO_4$ (0-10% wt), other trace metals, and $H_2O$ (20%-85% wt). If necessary, the ORP may then be readjusted downwards by adding more $FeCl_2$. It has also been found that in the process of controlling the pH and ORP, the addition of another reducing agent, sodium hydroxide (NaOH), can raise the pH high while lowering the ORP. Thus, using the treatment solution with incrementally added reducing agents, one can enhance the removal of contaminants in a contaminated aqueous source (in this instance, contaminated with selenium), by adjusting the pH and ORP of the combination of a treatment solution with the contaminated aqueous source.

Figures 4, 5A:
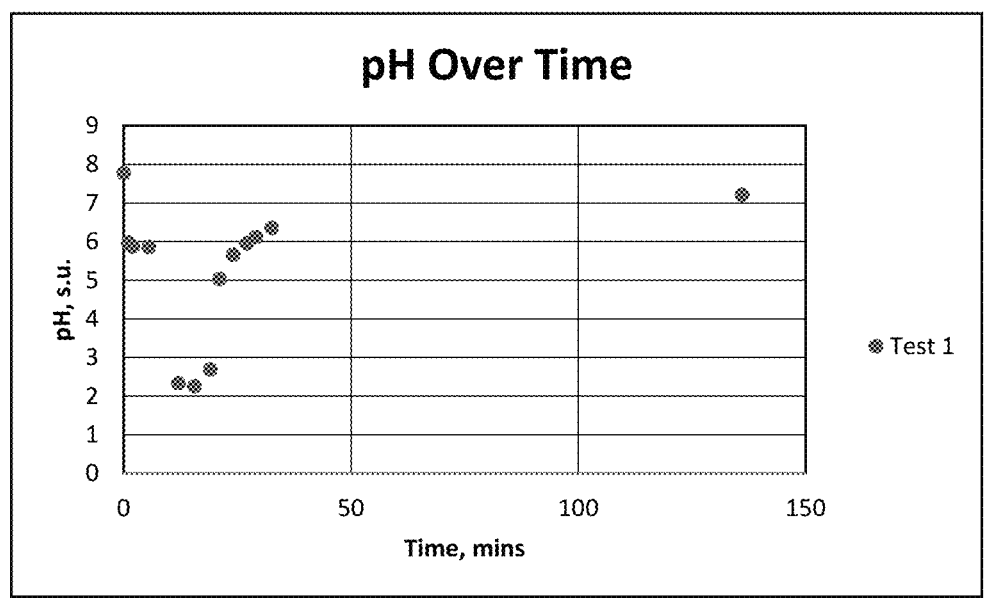
FIG. 4 is a summary table of the test protocol results of the test disclosed in FIG. 3.
FIGS. 5A & 5B trace the pH (FIG. 5A) and ORP (FIG. 5B) over time of the test sample of FIG. 3 demonstrating the adjustment variation in these values to achieve the maximum removal of contaminant.

FIG. 4 is a summary table of the test protocol results of the test disclosed in FIG. 3. Over the course of time, and under the various treatments provided as shown in FIG. 3, selenium was effectively removed—as much as ninety-six percent (96%) from the contaminated aqueous source.

Figure 5B:
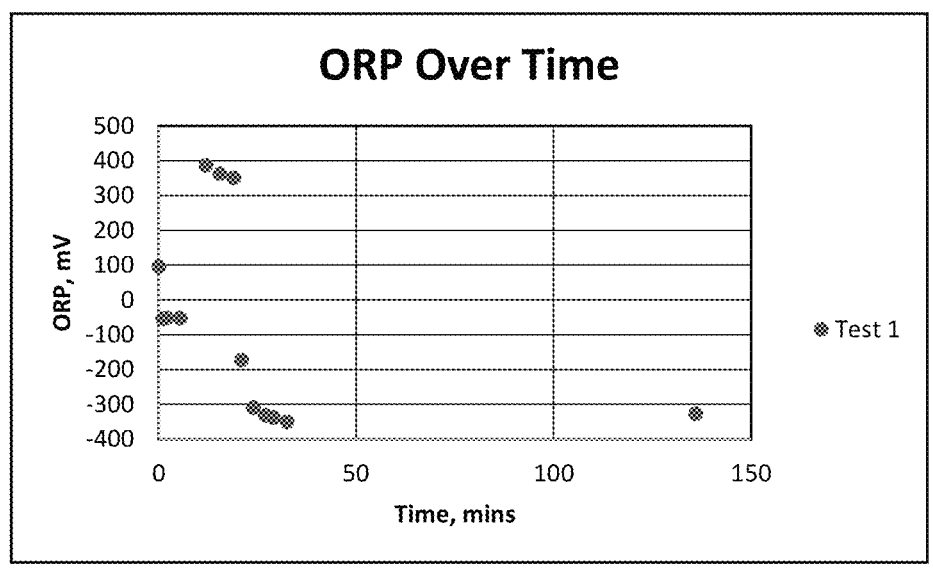

FIGS. 5A & 5B trace the pH (FIG. 5A) and ORP (FIG. 5B) over time of the test sample of FIG. 3 demonstrating the adjustment variation in these values to achieve the maximum removal of contaminant.

Figure 6:
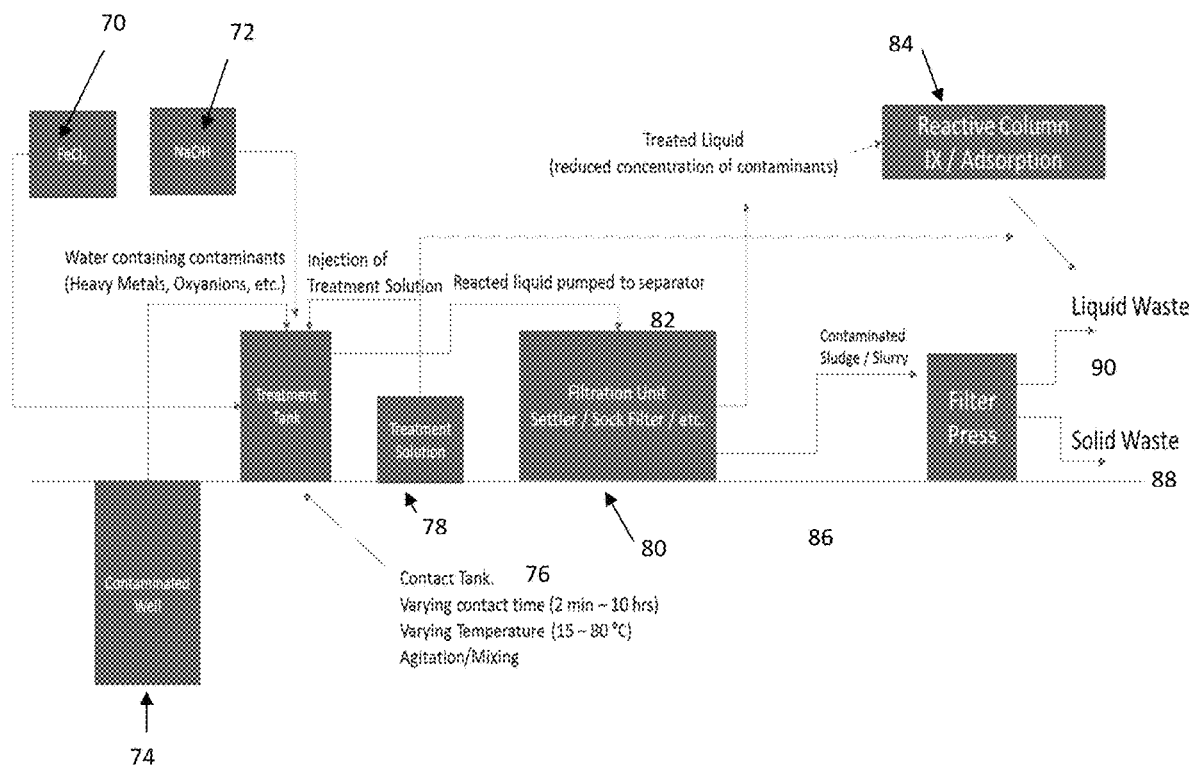
FIG. 6 depicts a process flow diagram of the treatment system and methodology to optimize ORP in order to remove the exemplary contaminant selenium.

FIG. 6 depicts a process flow diagram of the treatment system and methodology to optimize ORP in order to remove the exemplary contaminant selenium. Contaminated well water 74 is added to a treatment tank 76. The contaminated well water includes heavy metals, oxyanions, and other contaminants. Treatment solution 78 is then added to treatment tank 76, and the product is mixed or agitated. Reducing agents, such as ferrous chloride ($FeCl_2$) and sodium hydroxide (NaOH), are added to the treatment tank 76 to adjust (and readjust if necessary) the pH and ORP of the resultant solution within treatment tank 76. The reacted liquid is then transferred (pumped) to a filtration unit 80, such as a separator, settler, sock filter, or other such filter media.

Treated liquid, having significantly reduced contaminants, may then exit filtration unit 80, as depicted by line 82, or optionally be introduced into a second filter media for further filtration, such as a reactive column ion exchange and/or adsorption media 84 to further reduce, if necessary, the concentration of selenium.

Contaminated sludge/slurry exiting filtration unit 80 may be directed to a filter press 86, where the solid waste 88 can be pressed and converted into cake, and the liquid waste 90 can be subsequently disposed.

In another embodiment, the treatment solution described in this invention may be added to the effluent stream of the column as described above and after the addition of NaOH. In some cases, the addition of NaOH results in an undesirable pH and ORP. Black liquor may be introduced to mitigate these effects. The use of the disclosed invention allows for the neutralization of the water with the additional benefit of having co-precipitation.

Figures 7, 8:
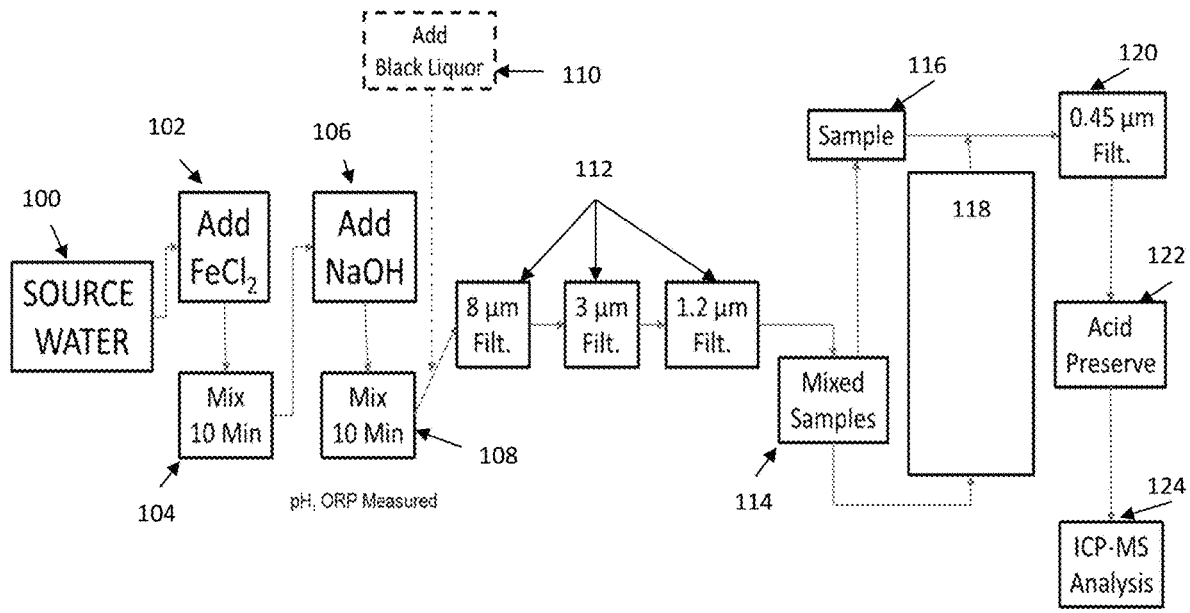
FIG. 7 depicts an embodiment of the reduction technology process of the present invention for removing the contaminant selenium from an aqueous source, where precipitation only is performed with an optional step for adding titania-based black liquor.
FIG. 8 depicts the data for three different contaminant reduction processes of selenium, wherein in a first process, precipitation only is performed, in a second process, high pH is followed by neutralization using titania-based black liquor, and in a third process, precipitation is followed with adding $TiO_2$.

FIG. 7 depicts an embodiment of the reduction technology process of the present invention for removing the contaminant selenium from an aqueous source, where precipitation only is performed with an optional step for adding the aforementioned black liquor. Source water 100 is treated with a ferrous chloride ($FeCl_2$) reducing agent 102, to reduce the ORP of the contaminated fluid, and mixed for a predetermined period of time 104, here shown as ten (10) minutes. Next, if necessitated based on the pH and ORP measured values, another reducing agent 106, sodium hydroxide (NaOH), is added, and the resultant solution is mixed again 108 for a predetermined period of time 108. The ORP and pH values are determined. If necessary, the optional step of adding black liquor to this process is initiated prior to further filtration cycles 112, shown here as 8 μm, 3 μm, and 1.2 μm filtration screens. Samples are mixed 114 and either fed to a separate filtration unit or sorption media bed 118 and may exit through a finer filter screen 120, such as a 0.45 μm screen, on to an acid preserve 122, for further analysis 124.

FIG. 8 depicts the data for three different contaminant reduction processes of selenium (this being an illustrative contaminant example) of the present invention. In a first process, precipitation only is performed. In a second process, high pH is followed by neutralization using black liquor as defined herein. And in a third process, precipitation is followed with adding $TiO_2$. The results show significant reduction of selenium, especially when subjecting the contaminated aqueous source water to a treatment solution of black liquor. As noted, the resultant sludge met environmentally safe standards (TCLP—Se ppb) under these reduction processes.

Figure 9:
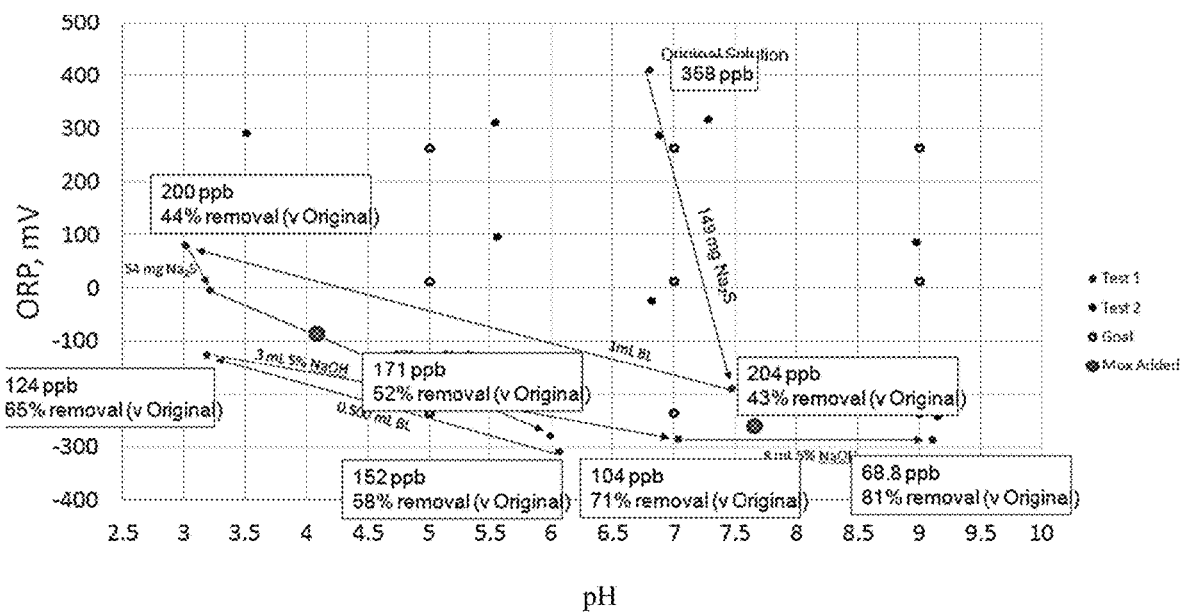
FIG. 9 is a chart depicting the test results of using sodium sulfide as a reducing agent to adjust (and re-adjust) the pH and ORP levels for removing a contaminant (Se) from an aqueous source.

In another embodiment, sodium sulfide ($Na_2S$) was used as a reducing agent, and shown with success to remove contaminants. FIG. 9 is a chart depicting the test results of using sodium sulfide as a reducing agent to adjust (and re-adjust) the pH and ORP levels for removing a contaminant (Se) from an aqueous source. As indicated, for various testing and adjustment schemes (adjusting the values of pH and ORP), there was a 40% to 80% reduction (ppb) in contaminant versus the original aqueous source.

Generally, in one or more preferred embodiments, the treatment solutions are included in a process to remove oxyanions according to the following methodology. First a contaminated stream is pumped into a container. A reducing agent is added to the solution at a rate in order to control the pH and ORP to between 5-8 pH and −100 to 0 mV, respectively. The treatment solution of this invention may be added to reduce the pH further, or to between 2.5 and 7 pH. Upon the addition of the solution, the ORP may change. After contacting for 5-30 minutes, sodium hydroxide is added to control the pH to between 6.5 and 11 and the ORP between −600 mV and 0 mV. The solutions are mixed together and contacted for between 5 minutes to 2 hours to allow for precipitation of contaminants. The solution is then passed through a series of filters/separators to separate out the contaminated solids, from the liquid stream. The liquid stream may be directly discarded into a waste form or proceed with further treatment. In an additional embodiment, the stream passes through a bed of media. For example, the stream could pass through a bed of Metsorb®HMRG at a 3-5 min empty bed contact time; a bed of iron (zero valent iron) in an up-flow direction at a 5-10 min EBCT; or other such columns to further treat the contaminated water for the same contaminant or for different contaminants.

This methodology can be applied in various modifications to pH and ORP to remove contaminants such as Selenium, selenite, selenate, arsenite, arsenate, antimonate, and other oxyanions.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A treatment solution for removing contaminants from contaminated aqueous source, said treatment solution comprising: a liquid solution of mixed metal oxides, 5 wt % to 25 wt % sulfuric acid matrix, and 20 wt % to 85 wt % water, wherein said mixed metal oxide comprises 10 wt % to 50 wt % $TiO(SO_4)$, and an 0 wt % to 10 wt % iron salt comprising $FeSO_4$, $FeCl_2$, or $Fe(NO_3)_2$.

2. The treatment solution of claim 1 wherein said treatment solution is capable of removing lead, arsenic, selenium, chromium (III), chromium (IV), barium, antimony, fluoride, vanadium, and/or mercury.

3. The treatment solution of claim 1 wherein said pH of a combination of said contaminated aqueous source and said treatment solution is between 5-11 and ORP between −600 mV to 0 mV.

4. A treatment solution for removing contaminants from contaminated aqueous source, said treatment solution comprising:
5 wt % to 25 wt % sulfuric acid solution;
10 wt % to 50 wt % titanium ions or oxides in said sulfuric acid solution; and
iron ions or oxides in said sulfuric acid solution; and sodium hydroxide (NaOH);
  wherein, together said titanium ions or oxides and said iron ions or oxides in said sulfuric acid solution render said treatment solution to react in-situ with said contaminated aqueous source to precipitate or sorb said contaminants out of said contaminated aqueous source, and wherein said pH is between 5-11 and ORP between −600 mV to 0 mV;
  wherein said sodium hydroxide (NaOH) is added to raise the pH high while lowering the ORP; and
  wherein said titanium ions or oxides and said iron ions or oxides in said sulfuric acid solution includes $TiO(SO_4)$, $H_2SO_4$, and an iron salt, said iron salt comprising $FeSO_4$, wherein said $FeSO_4$ is within the range of 0% to 10% wt.

5. The treatment solution of claim 4 wherein the $TiO(SO_4)$ is present in a titanyl sulfate solution in an amount ranging from 10% to 40%.

6. The treatment solution of claim 4 wherein the treatment solution further includes one or more of trace metals, trace salts, and $H_2O$.

7. The treatment solution of claim 4 wherein said treatment solution is capable of removing heavy metal contaminants, oxyanion contaminants, cationic contaminants, or combinations thereof.

8. The treatment solution of claim 7 wherein said treatment solution is capable of removing lead, arsenic, selenium, chromium, hexavalent chromes, barium, antimony, fluoride, vanadium, and mercury.

9. The treatment solution of claim 4 including sodium hydroxide to control the pH between 6.5 and 11, and ORP between −600 mV and 0 mV.

* * * * *